United States Patent
Mann et al.

(10) Patent No.: US 10,740,692 B2
(45) Date of Patent: Aug. 11, 2020

(54) MACHINE-LEARNING AND DEEP-LEARNING TECHNIQUES FOR PREDICTIVE TICKETING IN INFORMATION TECHNOLOGY SYSTEMS

(71) Applicant: Loom Systems Ltd., Tel Aviv (IL)

(72) Inventors: Dror Mann, Tel Aviv (IL); Yaron Lehmann, Tel Aviv (IL); Gabby Menahem, Petach Tikva (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/231,645

(22) Filed: Dec. 24, 2018

(65) Prior Publication Data
US 2019/0132191 A1 May 2, 2019

Related U.S. Application Data

(63) Continuation-in-part of application No. 15/785,863, filed on Oct. 17, 2017.
(Continued)

(51) Int. Cl.
| | |
|---|---|
| *G06F 11/00* | (2006.01) |
| *G06N 20/00* | (2019.01) |
| *H04L 12/24* | (2006.01) |
| *G06F 16/31* | (2019.01) |
| *G06F 16/35* | (2019.01) |

(Continued)

(52) U.S. Cl.
CPC ............. *G06N 20/00* (2019.01); *G06F 11/30* (2013.01); *G06F 16/313* (2019.01); *G06F 16/3329* (2019.01); *G06F 16/35* (2019.01); *G06N 5/02* (2013.01); *G06Q 10/04* (2013.01);
(Continued)

(58) Field of Classification Search
CPC .......................... G06F 11/079; G06F 11/0775
See application file for complete search history.

(56) References Cited

U.S. PATENT DOCUMENTS

| | | | |
|---|---|---|---|
| 5,787,234 A * | 7/1998 | Molloy | ................ G06F 16/334 706/46 |
| 6,367,034 B1 | 4/2002 | Novik et al. | |

(Continued)

OTHER PUBLICATIONS

Symantec: Control Compliance Suite 11.0 User Guide; 2012; pp. 1-952.

(Continued)

*Primary Examiner* — Christopher S McCarthy
(74) *Attorney, Agent, or Firm* — Fletcher Yoder PC

(57) ABSTRACT

A system and method for predictive ticketing in information technology (IT) systems. The method includes extracting a plurality of features from monitoring data related to an IT system, wherein the plurality of features includes at least one incident parameter, wherein the monitoring data includes machine-generated textual data; applying a machine learning model to the extracted plurality of features, wherein the machine learning model is configured to output a suitable insight for an incident represented by the at least one incident parameter, wherein the suitable insight is selected from among a plurality of historical insights; and generating a predictive ticket based on the suitable insight, wherein the predictive ticket includes a textual description of an expected future symptom in the IT system.

17 Claims, 11 Drawing Sheets

Related U.S. Application Data

(60) Provisional application No. 62/610,427, filed on Dec. 26, 2017.

(51) Int. Cl.
    *G06N 5/02*          (2006.01)
    *G06Q 30/00*        (2012.01)
    *G06Q 10/00*        (2012.01)
    *G06F 16/332*       (2019.01)
    *G06Q 10/04*        (2012.01)
    *G06F 11/30*        (2006.01)
    *G06Q 10/06*        (2012.01)

(52) U.S. Cl.
    CPC ............ *G06Q 10/06* (2013.01); *G06Q 10/20* (2013.01); *G06Q 30/01* (2013.01); *H04L 41/0631* (2013.01)

(56) References Cited

U.S. PATENT DOCUMENTS

| | | | |
|---|---|---|---|
| 7,076,543 B1 | 7/2006 | Kirti et al. | |
| 8,447,722 B1 | 5/2013 | Ahuja et al. | |
| 9,037,896 B2 | 5/2015 | Addepalli et al. | |
| 9,043,332 B2 | 5/2015 | Noel et al. | |
| 9,294,631 B1 | 3/2016 | Cogan et al. | |
| 9,972,103 B2 | 5/2018 | Alves et al. | |
| 9,992,220 B2 | 6/2018 | Coates et al. | |
| 9,996,409 B2 | 6/2018 | Chen et al. | |
| 10,007,717 B2 | 6/2018 | Zhang et al. | |
| 10,015,185 B1 | 7/2018 | Kolman et al. | |
| 10,021,127 B2 | 7/2018 | DiValentin et al. | |
| 10,021,138 B2 | 7/2018 | Gill et al. | |
| 10,037,238 B2 | 7/2018 | Bikumala | |
| 10,043,006 B2 | 8/2018 | Puri et al. | |
| 10,050,917 B2 | 8/2018 | Alperovitch et al. | |
| 10,051,010 B2 | 8/2018 | Carver et al. | |
| 10,055,477 B2 | 8/2018 | Nojima | |
| 10,057,285 B2 | 8/2018 | Choudhary et al. | |
| 10,061,805 B2 | 8/2018 | Tidwell et al. | |
| 10,063,570 B2 | 8/2018 | Muddu et al. | |
| 10,102,054 B2 | 10/2018 | Wolf et al. | |
| 10,169,122 B2 | 1/2019 | Tee et al. | |
| 10,311,067 B2 * | 6/2019 | Chen ................. | G06F 16/24578 |
| 2003/0004966 A1 | 1/2003 | Bolle et al. | |
| 2003/0149586 A1 | 8/2003 | Chen et al. | |
| 2005/0060295 A1 | 3/2005 | Gould et al. | |
| 2005/0080806 A1 | 4/2005 | Doganata et al. | |
| 2006/0095521 A1 | 5/2006 | Patinkin | |
| 2007/0214164 A1 | 9/2007 | MacLennan et al. | |
| 2007/0220063 A1 | 9/2007 | O'Farrell et al. | |
| 2010/0017487 A1 | 1/2010 | Patinkin | |
| 2010/0057677 A1 * | 3/2010 | Rapp .................. | G06F 11/0709 707/E17.014 |
| 2010/0125911 A1 | 5/2010 | Bhaskaran | |
| 2010/0312522 A1 | 12/2010 | Laberge et al. | |
| 2010/0312769 A1 | 12/2010 | Bailey et al. | |
| 2012/0062574 A1 | 3/2012 | Dhoolia et al. | |
| 2012/0150859 A1 | 6/2012 | Hu | |
| 2012/0197896 A1 | 8/2012 | Li et al. | |
| 2013/0097701 A1 | 4/2013 | Moyle et al. | |
| 2013/0262656 A1 | 10/2013 | Cao et al. | |
| 2013/0268839 A1 | 10/2013 | Lefebvre et al. | |
| 2013/0311481 A1 | 11/2013 | Bhatt et al. | |
| 2014/0095425 A1 | 4/2014 | Sipple | |
| 2014/0129536 A1 | 5/2014 | Anand et al. | |
| 2014/0324862 A1 | 10/2014 | Bingham et al. | |
| 2015/0178637 A1 | 6/2015 | Bogojeska et al. | |
| 2015/0278823 A1 | 10/2015 | Kushnir et al. | |
| 2015/0370799 A1 | 12/2015 | Kushmerick et al. | |
| 2016/0034525 A1 | 2/2016 | Neels et al. | |
| 2016/0065594 A1 | 3/2016 | Srivastava et al. | |
| 2017/0063896 A1 | 3/2017 | Muddu et al. | |
| 2017/0075744 A1 * | 3/2017 | Deshpande ........... | G06F 11/079 |
| 2017/0178038 A1 | 6/2017 | Guven et al. | |
| 2017/0272458 A1 | 9/2017 | Muddu et al. | |
| 2018/0115464 A1 | 4/2018 | Fighel | |
| 2018/0146000 A1 | 5/2018 | Muddu et al. | |
| 2018/0157762 A1 | 6/2018 | Tee | |
| 2018/0159880 A1 | 6/2018 | Sood et al. | |
| 2018/0159885 A1 | 6/2018 | Baum et al. | |
| 2018/0173769 A1 | 6/2018 | Saperstein et al. | |
| 2018/0191754 A1 | 7/2018 | Higbee et al. | |

OTHER PUBLICATIONS

Introduction to Arima models, url: http://people.duke.edu/~mau/411arim.htm.

No stated author; Symantec TM Control Compliance Suite 11.0 User Guide; 2012; Retrieved from the Internet : https://www.scribed.com/document/126556709/CCS-User-Guide>; pp. 1-952, as printed. (Year: 2012).

Wikipedia definition for Grubbs' Test, Retrieved from "https://en.wikipedia.org/w/index.php?title=Grubbs%27 test_for_outliers&oldid=720201233", page last edited May 14, 2016.

Wikipedia definition of AdaBoost, Retrieved from "https://en.wikipedia.org/w/index.php?title=AdaBoost&oldid=768996379", page last edited Mar. 6, 2017.

Wikipedia definition of Fournier transform, Retrieved from "https://en.wikipedia.org/w/index.php?title=Fourier_transform&oldid=778201678", Page last edited on May 1, 2017.

Wikipedia definition of Hidden Markov model, Retrieved from "https://en.wikipedia.org/w/index.php?title=Hidden_Markov_model&oldid=778214092", page last edited on May 1, 2017.

Wikipedia definition of Kolmogorov-Smimov test, Retrieved from "https://en.wikipedia.org/w/index.php?title=Kolmogorov—Smirnov_test&oldid=776209221", Page last edited on Apr. 19, 2017.

Wikipedia definition of Mann-Whitney U test, Retrieved from "https://en.wikipedia.org/w/index.php?title=Mann—Whitney_U_test&oldid=778009689", Page last edited on Apr. 30, 2017.

Bitincka, et al., "Optimizing Data Analysis with a Semi-structured Time Series Database", 2010, pp. 1-9, url: https://www.usenix.org/legacy/event/slaml10/tech/full_papers/Bitincka.pdf.

Carasso, "Exploring Splunk", 2012, pp. 1-156, url: https://www.splunk.com/pdfs/exploring-splunk.pdf.

* cited by examiner

MACHINE-LEARNING AND DEEP-LEARNING TECHNIQUES FOR PREDICTIVE TICKETING IN INFORMATION TECHNOLOGY SYSTEMS

CROSS-REFERENCE TO RELATED APPLICATIONS

This application claims the benefit of U.S. Provisional Patent Application No. 62/610,427 filed on Dec. 26, 2017. This application is also a continuation-in-part of U.S. patent application Ser. No. 15/785,863 filed on Oct. 17, 2017. The contents of the above-referenced applications are hereby incorporated by reference.

TECHNICAL FIELD

The present disclosure generally relates to machine learning, and more particularly to providing predictive tickets in information technology systems using machine learning.

BACKGROUND

The amount of data generated by various machines (e.g., appliances, servers, software tools, etc.) connected in an organization is enormous. The machine-generated data may be in a structured textual format, an unstructured textual format, or a combination thereof. Examples for such machine-generated textual data include logs, metrics, configuration files, messages, spreadsheets, events, alerts, sensory signals, audit records, database tables, and so on.

A typical IT process proceeds as follows: data gathering begins when an end user contacts an IT professional to report an issue. The reported issue is described in the form of symptoms demonstrated from the user's perspective such as, for example, an identifier of an error message, inability to access a service, inability to start a system or program, and the like. For example, the user may call or email an IT professional to say that the workstation takes very long to log in, or may do so via a service portal. A ticket is created in an IT service management (ITSM) system for the issue. Tickets in the ITSM system are investigated and resolved.

The existing solutions include manually applying playbooks using human operators based on user-provided information for ITSM systems have various disadvantages. First, an issue is often reported in an open-ended problem that may be the result of a long, branching series of events. For example, a user report indicating that the user interface of an application is unusually slow may have multiple branching potential causes. Second, problems are often indicated by metrics (e.g., CPU, RAM, disk, network, etc.) that provide poor information regarding the problem itself. Third, the point at which a human operator may start investigating an issue is often far removed from the root cause such that determining the root cause is practically impossible. Due to these and other challenges, playbooks for solving incidents usually focus on gathering data and improving the starting point of the investigation, rather than solving the problem that caused the issue.

Various disadvantages of the existing solutions are caused at least in part by reliance on user-provided information for addressing issues. Specifically, the user-provided information may include inaccurate descriptions of issues provided by users, particularly when the symptoms of those issues are only loosely related to the underlying root causes. Further, different users may provide varying descriptions for the same symptom, which may result in symptoms that are essentially the same being addressed differently. Thus, any relationships between issues and descriptions thereof ultimately rely on manual inputs and, thus, are often inaccurate. This leads to misclassification of issues and, therefore, incorrect recommendations.

Another issue with existing solutions for addressing IT problems is that the urgency of issues may be determined to be different at different times of day due to different numbers of users reporting issues. However, these different numbers of users may be caused by, for example, variations in the total amount of users accessing services at different times of day.

Additionally, existing solutions often prove inconvenient for end users since they require users to submit information for tickets either personally or via a subordinate. Thus, a user typically needs to call, email, or visit a web portal in order to report an issue. Accordingly, issues often proceed unaddressed until users begin reporting the issues. If the user is not available to report the problem, the reporting may be delayed, thereby resulting in delaying the correction of the problem since the IT department is not aware of the issue.

Further, the options for reporting offered by a particular IT department may not be preferable to some users. For example, some IT departments may only provide the option of reporting issues using text provided through a web portal while the user would prefer to speak to a live representative. Further, the reporting itself may prove inconvenient, particularly when a user calls to report and there is a wait due to a high number of other users reporting simultaneously.

It would therefore be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for predictive ticketing in information technology (IT) systems. The method comprises: extracting a plurality of features from monitoring data related to an IT system, wherein the plurality of features includes at least one incident parameter, wherein the monitoring data includes machine-generated textual data; applying a machine learning model to the extracted plurality of features, wherein the machine learning model is configured to output a suitable insight for an incident represented by the at least one incident parameter, wherein the suitable insight is selected from among a plurality of historical insights; and generating a predictive ticket based on the suitable insight, wherein the predictive ticket includes a textual description of an expected future symptom in the IT system.

Certain embodiments disclosed herein also include a non-transitory computer readable medium having stored thereon causing a processing circuitry to execute a process, the process comprising: extracting a plurality of features from monitoring data related to an IT system, wherein the plurality of features includes at least one incident parameter, wherein the monitoring data includes machine-generated textual data; applying a machine learning model to the extracted plurality of features, wherein the machine learning model is configured to output a suitable insight for an incident represented by the at least one incident parameter, wherein the suitable insight is selected from among a plurality of historical insights; and generating a predictive ticket based on the suitable insight, wherein the predictive ticket includes a textual description of an expected future symptom in the IT system.

Certain embodiments disclosed herein also include a system for predictive ticketing in information technology (IT) systems. The system comprises: a processing circuitry; and a memory, the memory containing instructions that, when executed by the processing circuitry, configure the system to: extract a plurality of features from monitoring data related to an IT system, wherein the plurality of features includes at least one incident parameter, wherein the monitoring data includes machine-generated textual data; apply a machine learning model to the extracted plurality of features, wherein the machine learning model is configured to output a suitable insight for an incident represented by the at least one incident parameter, wherein the suitable insight is selected from among a plurality of historical insights; and generate a predictive ticket based on the suitable insight, wherein the predictive ticket includes a textual description of an expected future symptom in the IT system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
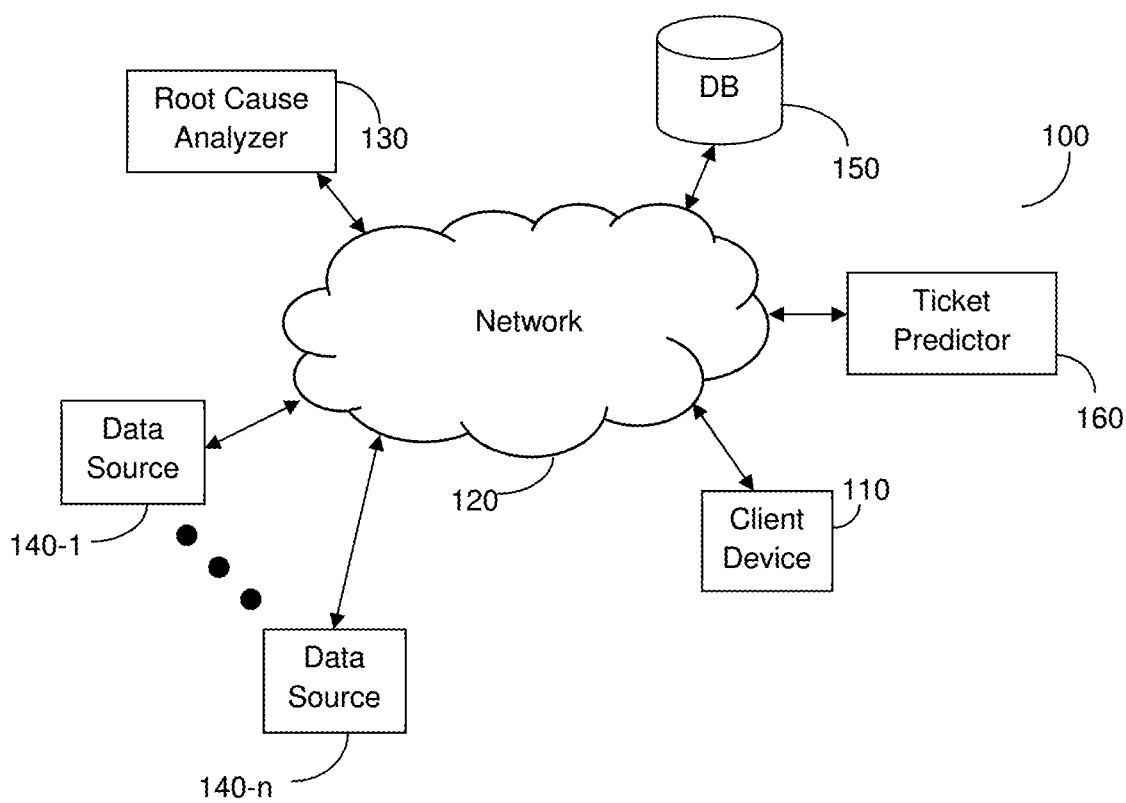
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments include a method and system for predictive ticketing utilizing machine learning techniques to generate predicted tickets based on detected anomalies. The anomalies may include anomalous behavior indicating incidents. In an embodiment, a suitability model is created using machine learning based on features including historical insight parameters, historical incident parameters, and historical matches between insights and corresponding incidents. To this end, the features are extracted from a historical data set including at least historical tickets and historical insights. The historical tickets include textual descriptions of symptoms of historical incidents. The historical insights indicate identifiers of respective historic incidents, recommendations of actions used for resolution of the respective historical incidents (e.g., for mitigating or fixing incidents), or both. The suitability model may be continuously refined as new data is received.

The historical data set includes machine-generated textual data, where anomalies in the machine-generated textual data may be indicative that an incident has occurred or will occur. During an operational phase, when an incident is detected, features are extracted based on monitoring data used. the suitability model outputs a suitable insight for the incident. A predictive ticket may be created based on the suitable insight. The predictive ticket includes at least a textual description of a symptom of the incident and may further include one or more recommendations for resolution of the incident. The predictive tickets created as described herein provide textual descriptions of symptoms that are more uniform for similar incidents as compared to, for example, descriptions of symptoms provided by end users and may be provided before symptoms actually manifest.

Incidents are problems in an information technology (IT) system which may include malfunctions or other failures of any resource in a monitored environment and may be detected based on anomalies in log data for an IT system. A suitable insight is selected for an incident based on a suitability score output by a suitability model using incident parameters of the incident and insight parameters of a plurality of insights as inputs. In some implementations, the insight with the highest suitability score may be selected as the suitable insight.

In some embodiments, a root cause for an incident may be determined by a machine learning model trained to identify root causes of incidents. A root cause analysis may be performed by aggregating and correlating potential incident patterns. Root causes determined via the root cause analysis may be enriched with descriptive information using machine learning. The predictive ticket may further include a textual description of any determined root causes for the incident.

The disclosed embodiments allow for predicting IT incidents without requiring user inputs by applying a machine learning model created based on historical IT incidents. As a result, the disclosed embodiments allow for providing IT tickets more quickly, processing IT tickets more efficiently, and avoiding human error in ticket data. Further, tickets may be provided preemptively prior to appearance of symptoms from an end user's perspective. Accordingly, responses to these IT tickets may be more efficient and involve less trial and error than existing manual ticketing processes that rely on user-provided reporting of symptoms for ticket creation and processing.

FIG. 1 shows an example network diagram 100 utilized to describe the various disclosed embodiments. The network diagram 100 includes a client device 110, a network 120, a root cause analyzer 130, a plurality of data sources 140-1 through 140-n (referred to individually as a data source 140 and collectively as data sources 140 for simplicity), and a ticket predictor 160. In some embodiments, the network diagram 100 further includes a database 150 communicatively connected to the network 120 and utilized to store machine-generated textual data, events processed based on machine-generated textual data, and classification results.

The client device 110 may be operated by a user (e.g., a system administrator) to control the operation of the root cause analyzer 130, view alerts and detected incidents, and so on. The network 120 may be, but is not limited to, a local area network (LAN), a wide area network (WAN), the Internet, a wired network, a wireless network, similar networks, and the like, as well as any combination thereof.

At least some of the data sources 140 generate machine-generated textual data. The data sources 140 may be different machines, systems, or software tools operable in an organization and configured to monitor, control, and report on issues related to, for example, computing infrastructure of an organization. Examples for the data sources 140 include any IT-based device, such as routers, network appliances, application servers, database servers, sensors, and the like. In general, any virtual or physical computing resource adapted to generate textual data can serve as one of the data sources 140.

The data sources 140 further include sources of tickets such as, but not limited to, information technology service management (ITSM) systems (e.g., ServiceNow®, BMC Remedy, etc.), ticket repositories, or both. The tickets may be, for example, created based on user submissions reporting issues (e.g., based on emails from users, phone calls with users, user inputs provided via web portals, etc.). Each ticket includes at least a textual description of an issue. The issue may be indicative of an incident (e.g., an incident for which a root cause is determined by the root cause analyzer 130). The data sources 140 may also include a root cause repository storing, for example, root causes determined by the root cause analyzer 130.

The machine-generated textual data generated by the data sources 140 may be, but is not limited to, application logs, configuration files, messages, spreadsheets, events, alerts, sensory signals, audit records, and so on. It should be noted that the data sources 140 include at least some different types of systems and, thus, the data provided by each data source 140 may be of a different format, structure, or both, than data provided by other data sources of the data sources 140. Further, some of the data sources 140 may output structured data while others may output unstructured data. The machine-generated textual data provided by the data sources 140 may be standardized or non-standardized.

The machine-generated textual data may be encapsulated in CSV files, JSON files, XML files, plain text files, and so on. Such files can be pulled from the sources 140, pushed to the ticket predictor 160 and to the root cause analyzer 130, uploaded to the ticket predictor 160 and to the root cause analyzer 130, received through other methods or channels, or a combination thereof. Typically, JSON and XML files are streamed in real-time, while CVS files are uploaded in batches.

In an embodiment, the ticket predictor 160 is configured to create a suitability model using historical incident and insight data. To this end, the historical data may include tickets featuring textual descriptions of symptoms of historical incidents, historical insights, and matches between the historical insights and the historical incidents. Each insight includes an identifier of its matching incident and may further include a recommendation for resolution of the incident. The incident data may further include root causes determined by the root cause analyzer 130. In yet another embodiment, the incident data may include detected anomalies. The ticket predictor 160 is configured to associate incidents with tickets.

During an operational phase, the suitability model is applied using features extracted from monitoring data as inputs to output suitable insights. Based on the output suitable insights, a predictive ticket is generated. The predictive ticket includes a textual description of an expected symptom of an incident that may manifest as an end user issue, and may further include a description or identifier of a root cause of the incident. Since the predictive ticket is based on a known insight that is determined to be suitable, different predictive tickets for the same or similar incidents include uniform descriptions of symptoms. Various processes of the ticket predictor 160 are described further herein below with respect to FIGS. 8-11.

The root cause analyzer 130 includes a processing circuitry and a memory (not shown) containing instructions that, when executed by the processing circuitry, configure the root cause analyzer 130 to learn root causes of incidents using machine learning based on historical data and to detect root causes of incident based on subsequent monitoring data. To this end, the root cause analyzer 130 is configured to classify the received machine-generated textual data into a set of statistical metrics. Types of the statistical metrics may include, but are not limited to, a histogram, a meter, a gauge, and the like. For example, CPU utilization and page-views may be classified as gauge metrics, purchases may be classified as a histogram metric, and message-clusters and hostnames may be classified as meter metrics. The root cause analyzer 130 may also be configured to output metadata associated with each event in the machine-generated textual data and a schema that can be used to structure the event. The schema allows for performing various operations on events such as, but not limited to, querying, filtering, manipulating, calculating statistical attributes, or otherwise handling the event or parts of the event.

In an embodiment, the root cause analyzer 130 may be configured to output a rich root cause analysis report indicating information related to identification of the suitable insights for an incident and any recommendations for addressing the incident based on the suitable insights.

The root cause analyzer 130 is further configured to process the various portions of an event to identify contextual tokens. Typically, contextual tokens are identified in messages included in the event. A message includes free-text that cannot be categorized as a property and has a length (e.g., number of characters) above a predefined threshold.

The metric utilized to classify events is determined for elements such as clusters of events, tokens, key-value pairs, and properties. In an embodiment, the determination of which metric type to associate with each element is based on the element's type, context, or a combination thereof. That is, for each identified element, it is determined whether the element's value can be statistically measured as any or all of a value distribution (histogram), an appearance rate (meter), or a value range (gauge). The context of an element can be utilized to determine its statistical value distribution. A metric is a statistical value distribution.

An example classification process is described in more detail in the above-referenced U.S. patent application Ser. No. 15/228,272, assigned to the common assignee, the contents of which are hereby incorporated herein by reference.

In an embodiment, the root cause analyzer 130 is configured to recognize incident patterns by processing the statistical metrics. The root cause analyzer 130 may be further configured to apply past behavior of each incident pattern to predict its future behavior. The recognized incident patterns are processed to determine a root cause of an incident. A set of meaningful incident patterns from the recognized incident patterns is processed. To this end, the root cause analyzer 130 is configured to determine which of the recognized incident patterns are meaningful. The meaningful incident patterns may be determined based on the amplitude of a pattern, a frequency of a pattern, a similarity of a pattern to previously detected patterns, a number of same or similar recognized patterns, or a combination thereof.

The root cause of an incident may be further determined by aggregating and correlating at least two recognized incident patterns. The correlation may be based on temporal proximity, a certain order (e.g., time, severity, or both), tracing certain entities in at least one incident pattern of a detected incident, and the like.

On example for determining root causes of incidents is described further in the above-referenced U.S. patent application Ser. No. 15/499,060 assigned to the common assignee, the contents of which are hereby incorporated by reference.

It should be appreciated that, as incident patterns may be generated by different types of applications and sources, the aforementioned incident pattern analysis allows for detection of a cause of an incident across applications and sources. For example, a cause for a failure of an application may be a firewall that blocked a specific IP address.

In some implementations, the root cause of a single incident pattern may be determined. That is, the root cause is determined without correlation of two or more incident patterns. In this implementation, upon detection of an incident, machine-generated textual data associated with the respective incident pattern are gathered. The gathered machine-generated textual data may include data which was received during a past predefined time window. For example, all application logs generated in the last hour since the detection of the incident are gathered. The machine-generated textual data may be classified or unclassified.

The gathered machine-generated textual data is analyzed to detect one or more entities that may cause the incident based on values of parameters associated with different entities. The values for any or all of the entities are extracted from the gathered textual data and compared to their respective historic values for each entity. A historic value represents at least normal behavior of an entity. Any entity that deviates from its respective value may indicate the root cause of the incident. The entities to be analyzed may be predetermined.

As an example, a failure in a number of servers installed in a rack cabinet is detected at time 22:27. The sensory signals including readings of the temperature in the rack cabinet since time 21:27 are gathered and compared to their respective historic values. Higher readings in the temperature since time 21:27 would indicate that the root cause is a rack's fan failure.

In an embodiment, the root cause analyzer 130 is configured to generate an alert indicating the determined root cause. In another embodiment, the root cause analyzer 130 is configured to group together alerts which have a common cause into one incident. In yet another embodiment, the root cause analyzer 130 is further configured to report any alert remaining after the root cause analysis with additional information related to the associated incident or incidents. That is, an alert would indicate the detected root cause and would be reported with the associated incident(s). This allows the user to drill down and better understand the problem potential solutions.

It should be noted that all incident patterns are generated from machine-generated textual data which are automatically processed and classified into statistical metrics. For example, an error log reported by a load balancer may be: "Error(s) found in configuration file: /etc/haproxy/haproxy.cfg" and an error reported by an application server may be: "Connection pool is full. discarding connection: [ConnectionName], path name: [PathName]" Thus, the root cause analyzer 130 is configured to determine the root cause of any incident by merely processing input machine-generated textual data.

In an embodiment, based on the determined root causes of incidents, the root cause analyzer 130 is configured to generate an enriched root cause for each incident. The enriched root cause for an incident includes a descriptive insight of the incident. The descriptive insight may be a textual insight of the incident, and may include or be associated with one or more recommendations. The recommendations may include, for example, suggestions of actions to be taken to fix or mitigate the incident. The insight may be a most suitable insight selected from among previously created insights that may be, for example, uploaded by users, generated by crawling the web for content, previously applied and tested, or a combination thereof.

In an embodiment, the root cause analyzer 130 is configured to select a suitable insight for a detected incident using machine learning. To this end, the root cause analyzer 130 is configured to create a suitability model using machine learning with respect to a historical data set containing features including at least parameters related to insights, parameters related to incidents, and matches between insights and incidents. The machine learning model outputs a suitability score for each insight with respect to an incident based on inputs including insight parameters of each insight, incident parameters of the incident.

In some implementations, the machine learning model may be refined based on user feedback. The user feedback may include, but is not limited to, voting scores (e.g., user provided scores, percentages of users that found the insight helpful, etc.), textual feedback (e.g., "unclear," "unhelpful," "unrelated," "trivial," "wrong," "duplicate," "helpful," "other," etc.), or both.

The machine learning model may be refined continuously based on self-tuning. The self-tuning may be based on, but not limited to, frequency of each insight, numbers of matching incidents for each insight, and the like. For example, an insight that comes up above a threshold frequency may be penalized (i.e., by resulting in a lower suitability score), while an insight that matched a number of distinct incidents below a threshold matching number may be encouraged (i.e., by resulting in a higher suitability score).

Each suitability score indicates a degree of matching between the incident and one of the insights. In an embodiment, the insight with the highest score may be selected. In another embodiment, multiple insights may be selected. The selected insights may be provided by, for example, displaying them to a user. Multiple selected insights may be displayed with respect to their scores (e.g., from highest to lowest score).

The insight parameters may include, but are not limited to, age (i.e., an amount of time since the insight was created, added, updated, etc.), number of relevant incidents for each insight, a number of distinct previously matching incidents for each insight, a frequency of each insight, a user reputation of the user who added each insight (for example, a user who is an expert in the field may be assigned a higher user reputation value than a novice), one or more characteristics of language in the insight (e.g., presence or absence of links or referrals), a source of each insight (e.g., an official document, a user-added insight repository, a web source found using web crawling, etc.), a combination thereof, and the like. With respect to age, recently added insights may correspond to higher suitability scores. With respect to numbers of relevant or previously matching incidents, insights having more relevant or previously matching incidents (i.e., insights which are either more generic or inappropriately matched) may correspond to lower scores.

The incident parameters may include, but are not limited to, identified root causes of incidents, times of incidents, locations of incidents (e.g., locations within a system or network), systems or components affected by incidents (e.g., hardware components or software sub-systems), incident type (e.g., starting, stopping, spiking, dropping, etc.), and the like.

Additional insights may be added over time such that the root cause analyzer 130 may be configured to update the machine learning model based on newly added insights. Some of the additional insights may include existing insights that have been updated, for example, an insight that has been edited by a user. Further, the machine learning model may be updated based on actions taken by users in response to incidents. Specifically, weights applied to each input feature may be updated based on actions such as, but not limited to, resolving, dismissing, and the like. For example, insights corresponding to dismissed incidents may correspond to lower suitability scores than other insights. The machine learning model may be updated in real-time in response to addition of insights, updating of insights, or actions taken by users, or may be updated continuously, for example, at predetermined time intervals.

It should be noted that tickets generated based on user inputs do not need to be received during the operational phase in order to generate predictive tickets, and that the generation of predictive tickets therefore allows for alerting an IT department regarding predicted future incidents end user intervention, thereby allowing for accelerated responses to root causes while minimizing end user interference. Further, since the predictive tickets are generated based on internal IT systems data rather than based on symptoms of issues experienced by end users, the predictive tickets allow for more accurate identification of root causes and, accordingly, more accurate selections of recommendations for address issues, than existing solutions.

It should be understood that the embodiments disclosed herein are not limited to the specific architecture illustrated in FIG. 1, and other architectures may be equally used without departing from the scope of the disclosed embodiments. Specifically, the ticket predictor 160 may reside in a cloud computing platform, a datacenter, and the like. Moreover, in an embodiment, there may be a plurality of classification servers operating as described hereinabove and configured to either have one as a standby, to share the load between them, or to split the functions between them. Additionally, the root cause analyzer 130 may be implemented as software stored in or executed by the ticket predictor 160 without departing from the scope of the disclosure.

Figure 2:
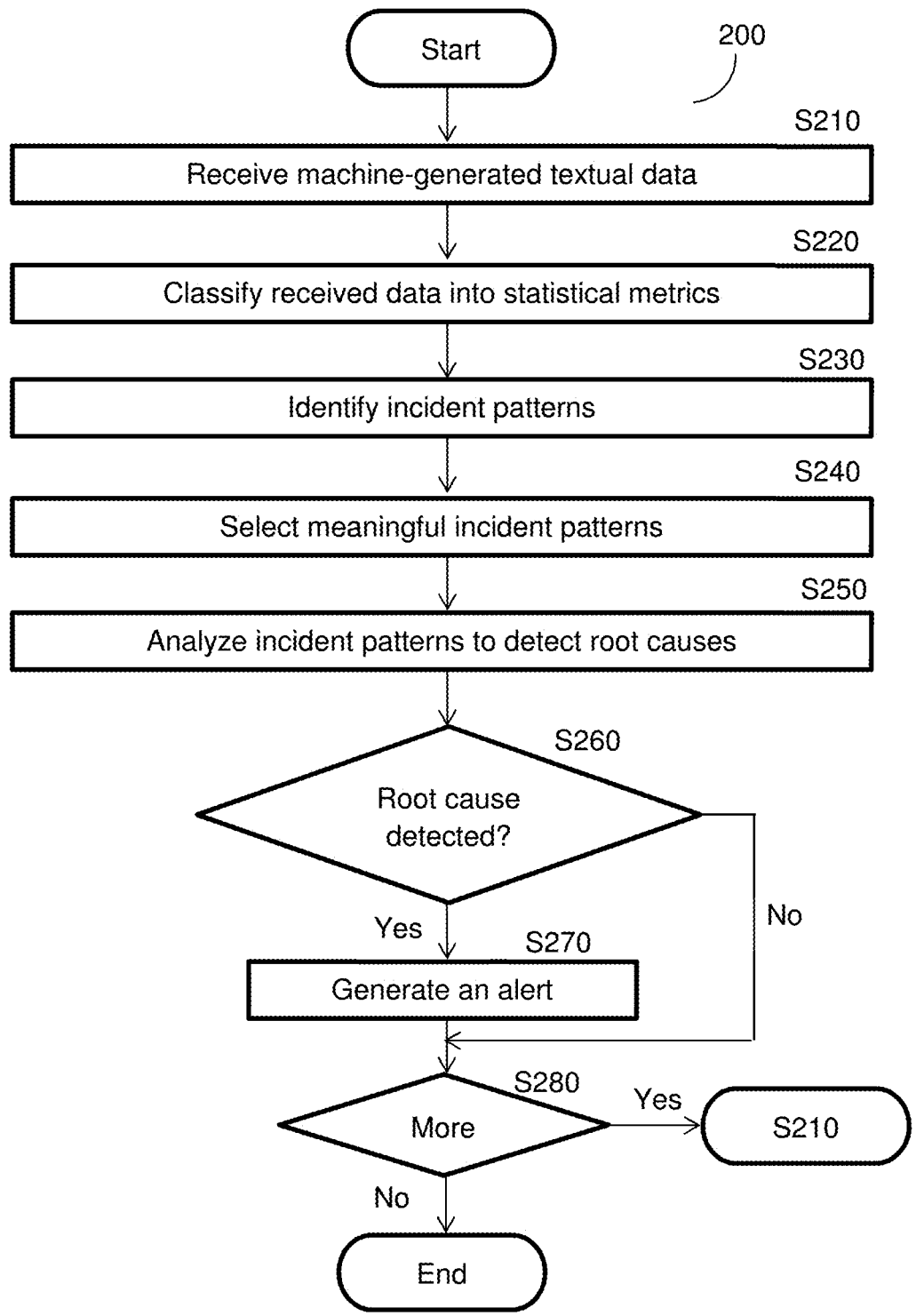
FIG. 2 is a flowchart illustrating a method for determining a root cause of an incident using machine-generated textual data according to an embodiment.

FIG. 2 shows an example flowchart 200 illustrating a method for determining a root cause of an incident based on machine-generated textual data according to an embodiment.

At S210, monitoring data including machine-generated textual data is received from a plurality of data sources. The machine-generated textual data may include, but is not limited to, application logs, configuration files, messages, spreadsheets, alerts, sensory signals, audit records, combinations thereof, and the like.

At S220, the received machine-generated textual data is classified into statistical metrics. As noted above, a statistical metric may include, but is not limited, a gauge, a meter, a histogram, and the like. In an embodiment, the classification process is performed as described in more detail in the above-referenced U.S. patent application Ser. No. 15/228,272.

At S230, the statistical metrics are processed to identify one or more incident patterns. In an embodiment, S230 includes applying a past behavior of each incident pattern to predict its future behavior. The incident patterns may include, but are not limited to, new behavior, anomalous behavior, changes in routine operations, ongoing trends, and so on.

At optional S240, a set of meaningful incident patterns are selected from among the identified incident patterns. A meaningful incident pattern is an incident pattern containing data (of a statistical metric) that can be utilized to determine a likely root cause of an observed or unobserved incident. Such meaningful patterns can be detected by considering the amplitude of a pattern, a frequency of a pattern, a similarity of a pattern to previously detected patterns, a number of detected same or similar patterns, or any combination thereof. For example, only incident patterns that were previously observed are considered meaningful. Limiting analysis of incident patterns to those determined to be meaningful allows for reducing extraneous processing of incident patterns that are unlikely to yield accurate root causes. For example, a minor change in behavior (e.g., a slight uptick of one additional error message in a week) may not be indicative of any issue, let alone a particular issue typically related to higher frequency of error messages.

At S250, the determined meaningful incident patterns are analyzed to identify any root cause of an incident (observed or unobserved). An observed incident is reported in an alert, while an unobserved incident exists or likely will soon exist in the monitored environment but has not been discovered yet. In an embodiment, the monitored environment is any IT infrastructure and any computing resource included therein. Examples for such resources include network devices, computers, servers, software applications, software services, storage devices, storage networks, and the like. An incident may be, for example, a failure or malfunction that negatively affects the operation of such a resource.

In an embodiment, the analysis includes correlating the incident patterns (meaningful or not) using different correlation types. Such a correlation type may include time-proximity correlation, component-based (i.e., correlation of incident patterns across different components), order-based (i.e., correlation of incident patterns based on a certain order), or a combination thereof. The root cause is determined based on the correlation type being utilized. The different correlation types are discussed in greater detail below and for the sake of the simplicity of the discussion are not repeated herein.

At S260, it is checked if a root cause of an incident is determined based on the analysis of the meaningful incident patterns. If so, execution continues with S270, where an alert is generated and reported; otherwise, execution proceeds with S280. The generated alert is a predictive ticket indicating at least the determined root cause. In an embodiment, the root cause included in the alert may be enriched as described herein with respect to FIG. 5.

At S280, it is checked if there are additional data logs to be processed; if so, execution returns to S210; otherwise, execution terminates.

Figure 3:
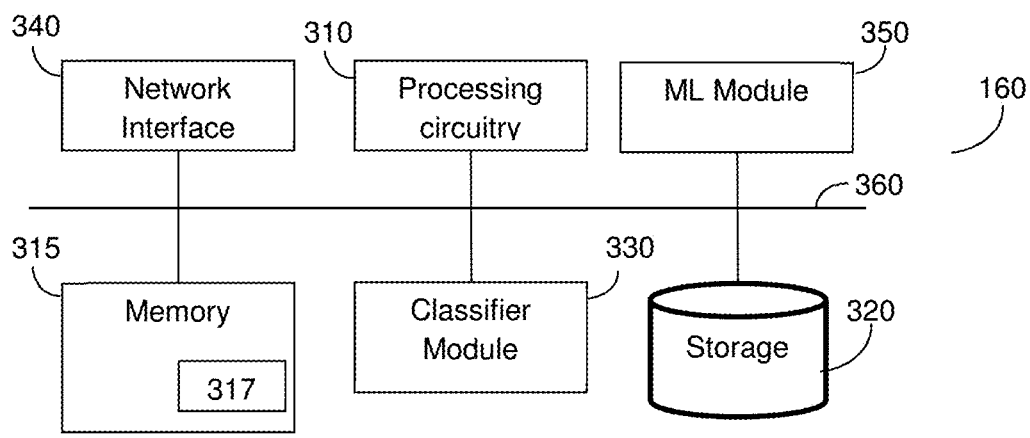
FIG. 3 is a block diagram of a ticket predictor according to an embodiment.

FIG. 3 shows an example block diagram of the ticket predictor 160 according to an embodiment. The ticket predictor 160 includes a processing circuitry 310 coupled to a memory 315, a storage 320, a classifier module 330, a network interface 340, and a machine learning (ML) module 350. In an embodiment, the components of the ticket predictor 160 may be communicatively connected via a bus 360.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 315 may be volatile (e.g., RAM, etc.), non-volatile (e.g., ROM, flash memory, etc.), or a combination thereof. In one configuration, computer readable instructions to implement one or more embodiments disclosed herein may be stored in the storage 320.

In another embodiment, the memory 315 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 310 to perform the various processes described herein. Specifically, the instructions, when executed, configure the processing circuitry 310 to determine root cause of incidents based on machine-generated textual data. In a further embodiment, the memory 315 may further include a memory portion 317 including the instructions.

The storage 320 may be magnetic storage, optical storage, and the like, and may be realized, for example, as flash memory or other memory technology, CD-ROM, Digital Versatile Disks (DVDs), or any other medium which can be used to store the desired information. The storage 320 may store the received machine-generated textual data, events, metadata for events, events schema, various elements of each events, and/or the classification results.

The classifier module 330 is configured to apply a classifier in order to classify machine-generated textual data into metrics to enable systems to ingest, process, analyze, aggregate, and correlate the data by machines without scale or volume limitations. In an embodiment, processes performed by the classifier module 330 may be performed as discussed in greater detail in the above-referenced Ser. No. 15/499,060 Application. The classifier module 330 may be realized as, for example, a support vector machine. To this end, the suitability model determined as described herein may be applied to classify incident parameters, root cause features, or both, into suitable insights.

The network interface 340 allows the ticket predictor 160 to communicate with the data sources 140 for the purpose of, for example, receiving machine-generated textual data. The ticket predictor 160 can be utilized to output textual descriptions of potential future incidents, predictive tickets, or both, to external systems (not shown) for further processing. In an embodiment, the network interface 340 can allow interface with client devices to view the classification results, to configure the ticket predictor 160, or both.

The machine learning module 350 is at least configured to apply suitability models to application inputs to determine suitability scores for insights with respect to incidents as described herein. The machine learning module 350 may be further configured to create suitability models using historical data as inputs as described herein.

It should be understood that the embodiments described herein are not limited to the specific architecture illustrated in FIG. 3, and that other architectures may be equally used without departing from the scope of the disclosed embodiments.

Figure 4A:
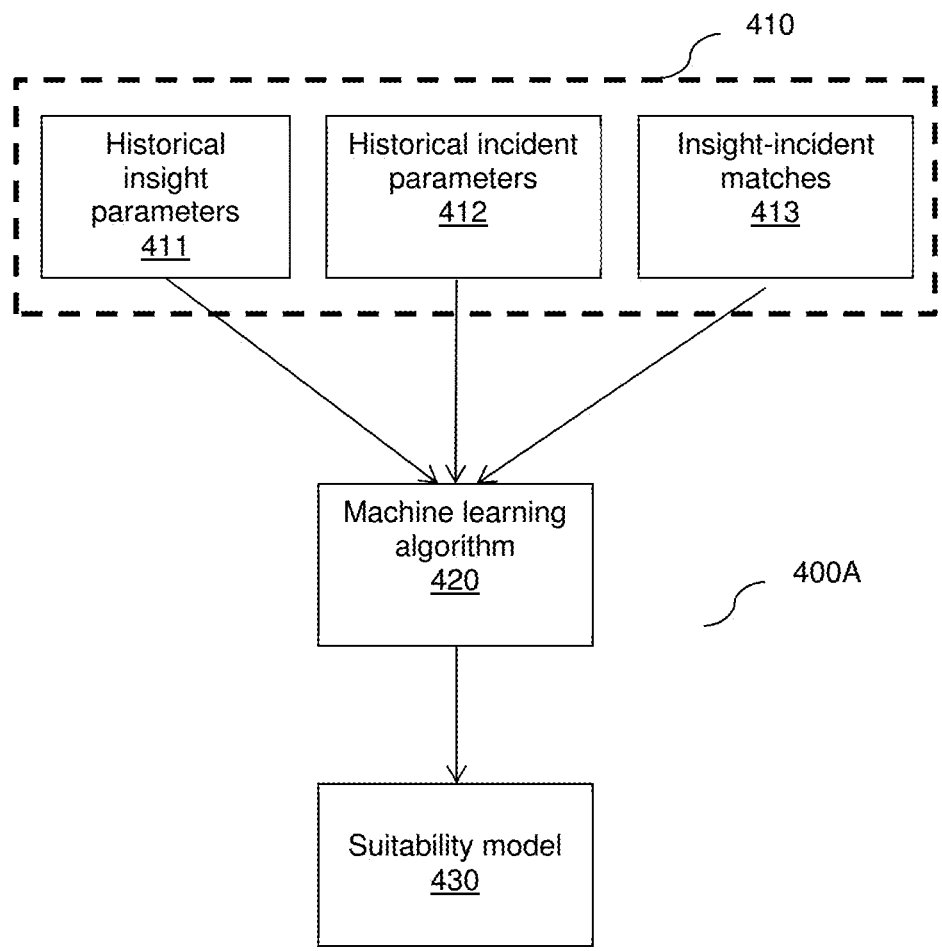
FIGS. 4A and 4B are flow diagrams illustrating machine learning to create a suitability model and application of the suitability model, respectively, according to an embodiment.

FIG. 4A is a flow diagram 400A illustrating machine learning to create a suitability model according to an embodiment. A labeled historical data set 410 is fed to a machine learning algorithm 420 to generate a suitability model 430.

The labeled historical data set 410 includes sequences of historical data such as historical insight parameters 411 as well as historical incident parameters 412. The labeled historical data set 410 also includes historical insight-incident matches 413. The labeled historical data set 410 may be sampled based on, e.g., a predefined sampling scheme; may be gathered over a period of time (i.e., as insights are provided for incidents); may be based on historical data from a common source (e.g., "Apache Webserver logs") or data demonstrating global contexts (e.g., "HTTP 404"); and the like.

In an embodiment, at least some of the data of the historical data set 410 may be utilized as features that are input to the machine learning algorithm 420. In a further embodiment, the features may be extracted based on analysis of any of the insight parameters 411 and the incident parameters 412. The features are related to properties of incidents, properties of insights, and matches between incidents and insights. In particular, the features may include textual descriptions of incidents that are included in matching insights for each incident. The features may also include parameters related to corrective actions utilized for different incidents, textual or numerical feedback of insights for previous incidents, or both.

Upon feeding the historical data set 410 to the machine learning algorithm 420, a suitability model 430 is generated. The suitability model 430 is utilized to generate suitability scores for insights with respect to incidents.

Figure 4B:
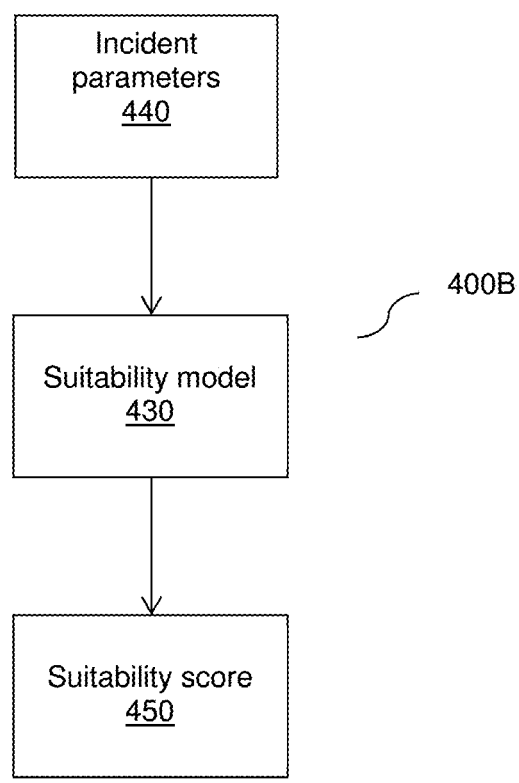

FIG. 4B shows a flow diagram 400B illustrating application of the suitability model 430 according to an embodiment. A suitability score 450 is generated by inputting an application input set 440 to the suitability model 430.

The application input set 440 may include sequences of application incident parameters. The application input set 440 may be extracted from monitoring data (e.g., log data) received from one or more data sources (e.g., the data sources 140, FIG. 1) in a monitored environment. Each application input of the application input set 440 may have the same input structure as a portion of the historical data set 410. The suitability score 450 indicates a likelihood that the insight is suitable for the incident, and may be utilized to select a most suitable insight for a given incident.

In an embodiment, at least some of the data of the application input set 440 may be utilized as features that are input to the suitability model 430. Alternatively or collectively, any data of the application input set 440 may be analyzed, and the features may include results of the analysis. For example, the analysis may include identification of key words in textual data.

Figure 5:
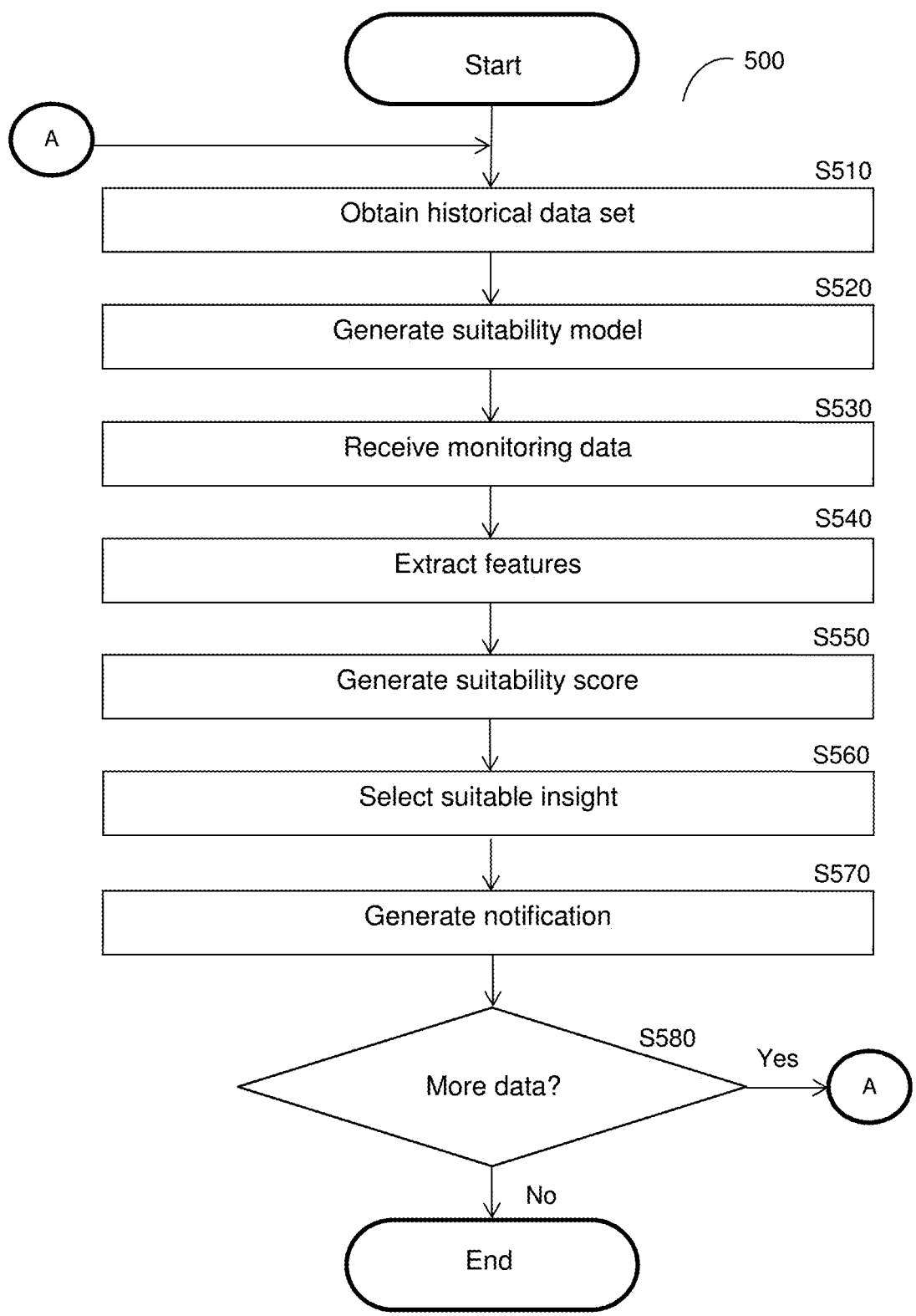
FIG. 5 is a flowchart illustrating a method for selecting suitable insights for incidents using machine learning based on machine-generated data according to an embodiment.

FIG. 5 is an example flowchart 500 illustrating a method for selecting suitable insights for incidents using machine learning according to an embodiment. In an embodiment, the method is performed by the ticket predictor 160.

At S510, a historical data set is obtained. The historical data set may be received from one or more data sources (e.g., the data sources 140, FIG. 1) each deployed in proximity to a monitored environment. A data source may be deployed in proximity to a monitored environment if it is located within the monitored environment, or if the data source is in communication with a machine configured to generate textual data related to the monitored environment.

The historical data set includes, but is not limited to, historical tickets and insights. Each historical ticket includes a textual description of a respective historical incident. The historical data set may further include historical matches between the historical insights and the historical incidents described in the historical tickets.

In an embodiment, S510 includes extracting features including insight parameters and incident parameters from the historical data. The insight parameters may include, for example, age, numbers of relevant incidents, numbers of matching incidents, and the like. The incident parameters may include, but are not limited to, known root causes for incidents, textual descriptions of symptoms (e.g., textual descriptions of symptoms provided in tickets created based on user-provided information), times, locations, systems or components affected, and the like. The textual descriptions of the incidents may be provided by users, determined automatically by crawling for textual content, and the like.

In an embodiment, the historical data set may be retrieved or may be generated. The historical insights and incidents may be matched automatically based on, e.g., analysis of the historical data. For example, the matching may be based on processing of a sequence of machine-generated textual data. Alternatively, the historical insights and incidents may be matched manually, i.e., based on a user input regarding the insights and incidents.

At S520, a suitability model is created using machine learning based on the historical data set. Specifically, the extracted features are input to a machine learning algorithm. In an embodiment, the suitability model is created using convolutional neural networks. The steps S510 and S520, collectively, may be utilized to build a classifier such as the classifier applied by the classifier module 330 of FIG. 3. The classifier may be configured to classify input incidents into output suitable insights.

In an embodiment, S520 may further include testing, validation, or both, of the suitability model. The testing and validation may be utilized to, e.g., refine, validate, or otherwise provide more accurate suitability scores.

At S530, monitoring data is received or retrieved. The monitoring data may be derived from log data from monitoring systems deployed with respect to IT systems and may include, but is not limited to, machine-generated textual data, environmental parameters (e.g., times or relative locations of incidents), identifiers of systems and components (e.g., systems and components affected by incidents), and the like.

At S540, features to be utilized as inputs to the suitability model are extracted based on the monitoring data. The features include at least incident parameters. The features may be extracted when a potential incident in the IT system is detected. The potential incident may be detected based on the monitoring data and may be, but is not limited to, an anomaly in the monitoring data.

In an embodiment, S540 may include analyzing the monitoring data, applying at least one transformation to the monitoring data, or both. In a further embodiment, S540 may include identifying root causes of incidents based on incident patterns in machine-generated textual data, for example as described herein above with respect to FIG. 2.

At S550, suitability scores are generated. In an embodiment, S550 includes applying the suitability model to the determined features. A suitability score may be generated for each historical insight with respect to an incident. In a further embodiment, S550 may also include selecting the suitability model based on the determined features. For example, different suitability models may be utilized for incidents affecting different systems or components. The selection of the suitability model may be performed by, for example, a classifier.

At S560, a suitable insight is selected for an incident based on the generated suitability scores. In an example implementation, the insight with the highest score with respect to the incident may be selected. In some implementations, multiple potentially suitable insights may be selected. The multiple potentially suitable insights may be displayed or organized with respect to their relative suitability scores.

It should be noted that the selected suitable insight does not need to be distinctly applicable to one incident. In some implementations, a particular insight may be suitable for multiple different incidents. Accordingly, the suitability selection may result in many-to-many suitability among incidents and suitable insights such that multiple insights may be suitable for each incident, and each suitable insight may be suitable for multiple incidents.

As a non-limiting example, an insight created at the resolution of a particular incident may be specific to that incident such that the insight is only selected as a suitable insight for similar incidents, while other insights are selected to be suitable based on the presence of particular terms or traits (e.g., the term "HTTP 404") and, therefore, may match multiple different incidents having these terms or traits.

At optional S570, a notification may be generated. The notification may indicate the suitable insights, the suitability scores, or both. Each insight may further include or be associated with one or more recommendations. To this end, the notification may further include the recommendations of the suitable insight. The notification may be sent to, e.g., a mobile device of an owner of the monitored area, to a website accessible to the owner of the target area, and the like.

At S580, it is determined if additional monitoring data has been received and, if so, execution continues with S530; otherwise, execution terminates. In an embodiment, additional inputs may be received continuously or periodically, thereby allowing for monitoring of the suitability based on, for example, newly added insights and newly identified root causes of incidents.

It should be noted that, in some embodiments, the steps S510 and S520 may be performed offline, at a remote time from the other steps of the method of FIG. 5, or both. The created suitability model may be refined continuously as new data is received. In an embodiment, the historical data matching and approximation of predictive functions may be performed only once initially, and may be repeated only as desired to determine, e.g., newly added insights, newly detected incidents, and so on. Further, in an embodiment, the suitability model may be further subjected to testing, validation, or both, thereby allowing for improvement of the prediction model, confirmation of the accuracy of the prediction model, or both.

It should be noted that at least a portion of the method of FIG. 5 may be repeated, thereby allowing for continuous monitoring and updating of the suitability model. Such continuous monitoring and updating allows for improved selection of insights for incidents and, specifically, for adapting insight selection based on newly added insights, newly determined root causes, and the like.

Figure 6:
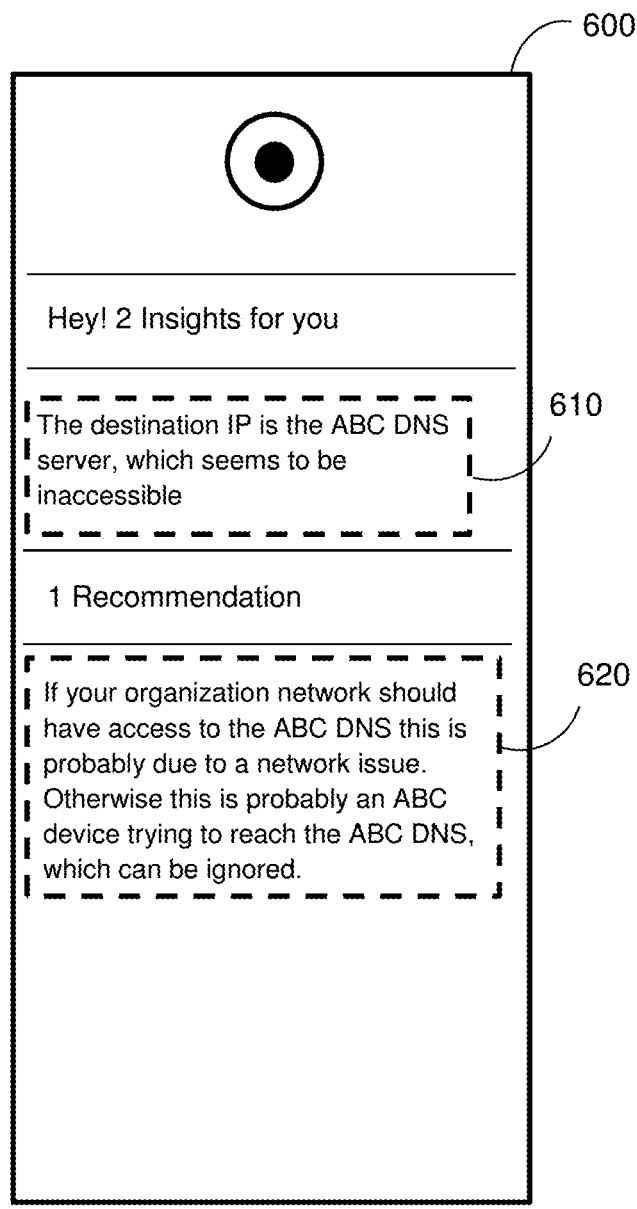
FIG. 6 is an example screenshot of an insight and recommendation.

FIG. 6 is an example screenshot 600 illustrating a notification providing textual descriptions of a potentially suitable insight 610 and a recommendation 620. In the example screenshot 600, the illustrated insight 610 is a textual description stating "The destination IP is the Google DNS server, which seems to be inaccessible." The recommendation 620 is associated with the inaccessible DNS server and indicates that the incident is either due to a network issue or can be ignored.

Figure 7:
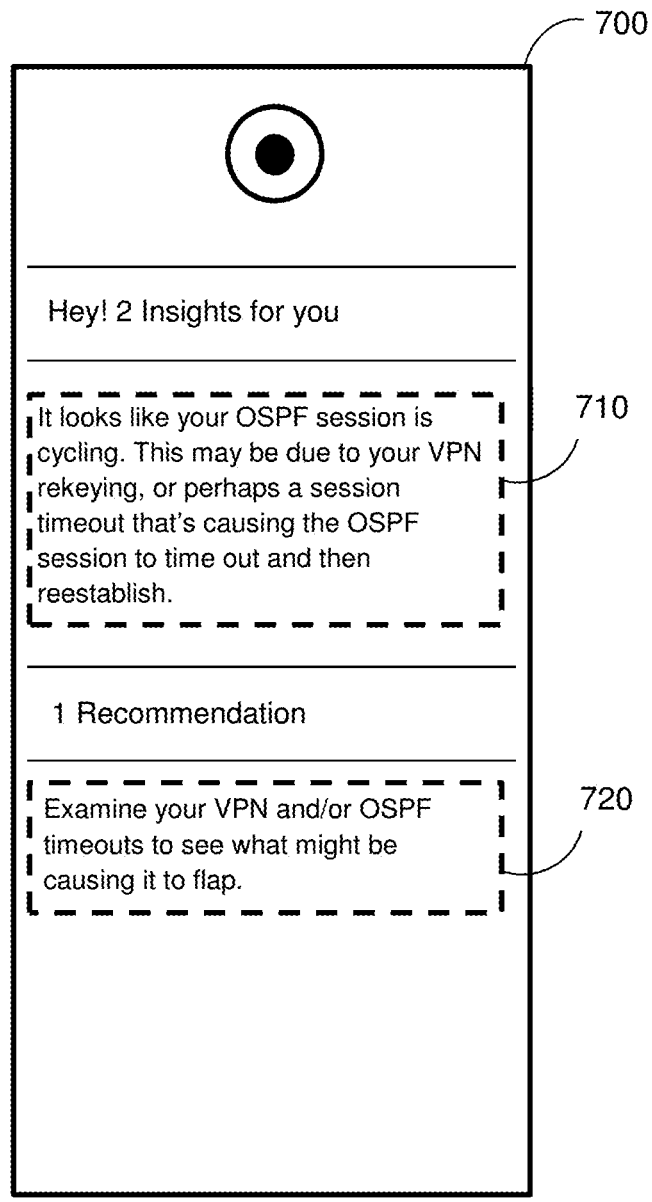
FIG. 7 is an example screenshot of an insight and recommendation.

FIG. 7 is an example screenshot 700 illustrating a notification providing textual descriptions of a potentially suitable insight 710 and a recommendation 720. In the example screenshot 700, the insight description 710 is a textual description stating "It looks like your OSPF session is cycling. This may be due to your VPN rekeying, or perhaps a session timeout that's causing the OSPF session to time out and then reestablish." The recommendation 720 is associated with the cycling OSPF session that suggests examining the VPN and/or OSPF timeouts.

Figure 8:
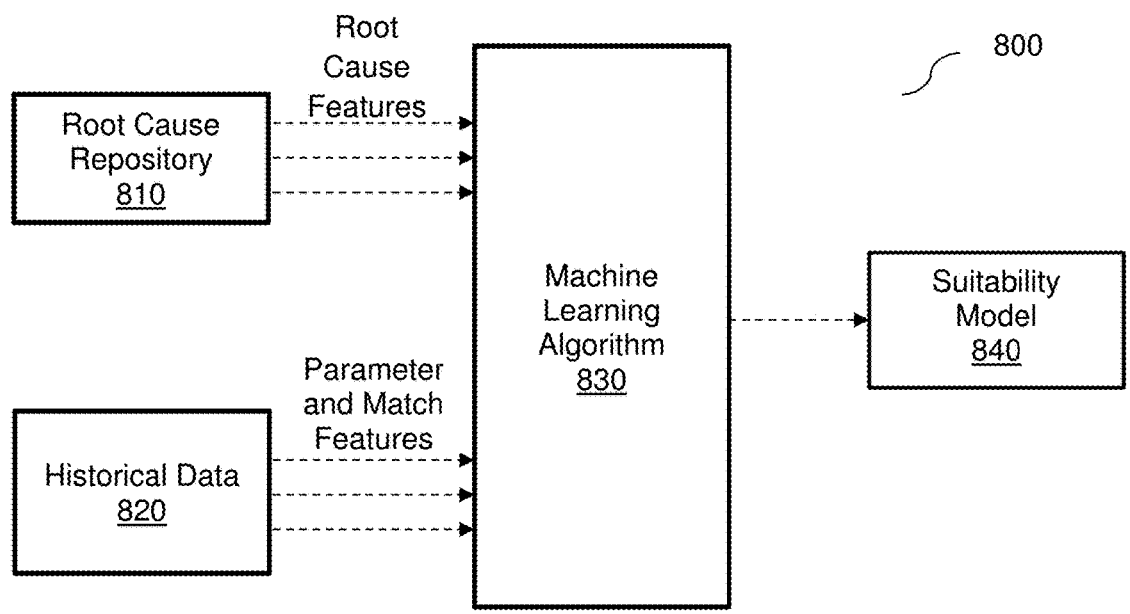
FIG. 8 is a flow diagram illustrating machine learning to create a suitability model according to an embodiment.

FIG. 8 is an example flow diagram 800 illustrating machine learning for creating a suitability model according to an embodiment. Features extracted from data in a historical data repository 820 are input to a machine learning algorithm 830. The historical data repository 820 stores historical tickets and insights such that the features extracted from data in the historical data repository 820 include insight parameters, incident parameters, and matches between insights and incidents.

In an optional embodiment, features extracted from historical root causes stored in a root cause repository 810 may also be input to the machine learning algorithm 830. The historical root causes relate to respective historical incidents indicated by the historical tickets determined, for example, as described herein above with respect to FIG. 2. The machine learning algorithm is configured to correlate between the historical root causes and the historical tickets.

In an embodiment, the machine learning algorithm 830 is configured to perform deep learning based on the historical root causes and historical tickets in order to learn a description that describes a root cause most accurately, most precisely, or both. Features extracted from, for example, the textual descriptions of issues, environmental context data (e.g., time of creation of a ticket), and root cause data (e.g., identification of root cause, end user issues, etc.), may be utilized for the deep learning.

In an embodiment, the machine learning algorithm 830 is configured to create a suitability model (SM) 840 using the extracted features. The extracted features may include, but are not limited to, ticket metadata (e.g., metadata indicating a time of creation of the ticket), textual descriptions of tickets, structured entities (e.g., host, username, IP address, application, service, etc.), unstructured entities (e.g., path, a name indicated in a description field, etc.), and the like. The extracted ticket features may also include keywords identified in a description of the ticket such as, but not limited to, "error" and "invalid." For example, the keywords may be identified in unstructured text including an error message that was copied and pasted into a reporting message by a user. The machine learning algorithm may further be configured to preprocess the data to be utilized for feature extraction by, e.g., cleaning, normalizing, and the like.

In an embodiment, the machine learning algorithm 830 is configured to perform machine-learned ranking (MLR) to identify similar tickets among the historical tickets. Specifically, a similarity score may be computed for each historical ticket. The similarity score indicates a degree of similarity of the historical ticket to other historical tickets. In a further embodiment, it may be determined which tickets have the highest similarity scores, for example, the top 5 tickets as ranked based on similarity scores, tickets having similarity scores above a threshold, both, and the like.

For a set of one or more of the historical tickets, the historical root causes are analyzed, and the same or similar historical root causes are determined for each set of historical tickets. In an example implementation, the tickets having the highest similarity scores are grouped into sets. To this end, the machine learning algorithm 830 is configured to compute a relation score for each highest similarity score ticket. In an embodiment, each relation score is determined based on a number of incidents indicated by the historical root cause having a matching attribute with the ticket. Each matching attribute may be an attribute that matches above a predetermined threshold and is among the features of the historical ticket and a corresponding historical root cause. As a non-limiting example, a username "josh1279" included in a historical root cause and in a textual description of a historical ticket may be a matching attribute.

Based on the relation scores, the machine learning algorithm is configured to associate tickets with corresponding root causes. As a non-limiting example, if the relation score between a ticket and a root cause is at least 80 (on a scale from 0 to 100), the ticket and the root cause may be associated. The association scores indicating degrees of associations between tickets and root causes are used to create a suitability model (SM) 840 that outputs predictive tickets based on input root causes.

It should be noted that FIG. 8 is described with respect to a single root cause repository and a single ticket repository merely for simplicity purposes and without limitation on the disclosed embodiments. Multiple root cause repositories, ticket repositories, or both, may be equally utilized without departing from the scope of the disclosure. Additionally, in some implementations, root causes and tickets may be received from root cause analyzer and ticketing systems (e.g., ITSM systems), respectively.

Figure 9:
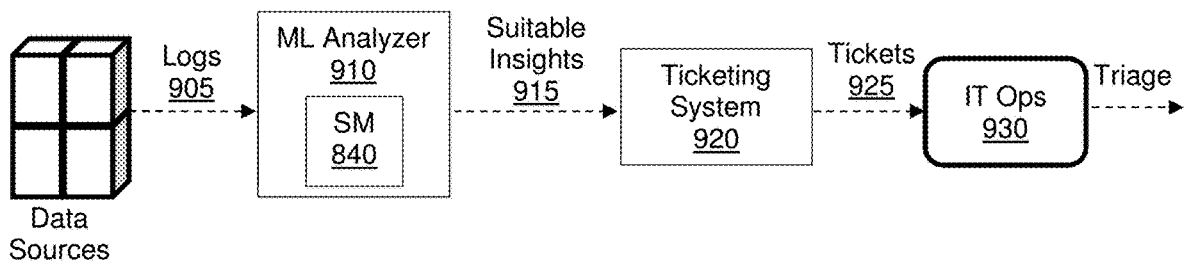
FIG. 9 is a flow diagram illustrating an example operational phase for predictive ticketing according to an embodiment.

FIG. 9 is a flow diagram 900 illustrating an example operational phase for predictive ticketing according to an embodiment. Monitoring data such as log data 905 is input to a machine learning analyzer 910. The machine learning (ML) analyzer 910 is configured to extract features from the log data 905 and to apply a machine learning model to the extracted features to determine suitable insights 915. To this end, the machine learning analyzer 910 is configured with a suitability model (SM) 840 created as described herein. In an embodiment, the machine learning analyzer 910 may further include or be communicatively connected to a root cause analyzer (e.g., the root cause analyzer 130, FIG. 1), and is configured to extract features from the logs 905.

The machine learning analyzer 910 sends the suitable insights 915 to a ticketing system 920. The ticketing system 920 may be, for example, an ITSM system. The ticketing system 920 is configured to generate predictive tickets 925 and to display, send, or otherwise provide IT operations (IT ops) 930 with the tickets 925. The predictive tickets 925 include textual descriptions of symptoms of upcoming incidents. The textual descriptions included in the predictive tickets may be textual descriptions included in the historical ticket for the historical incidents matching the suitable insights.

Figure 10:
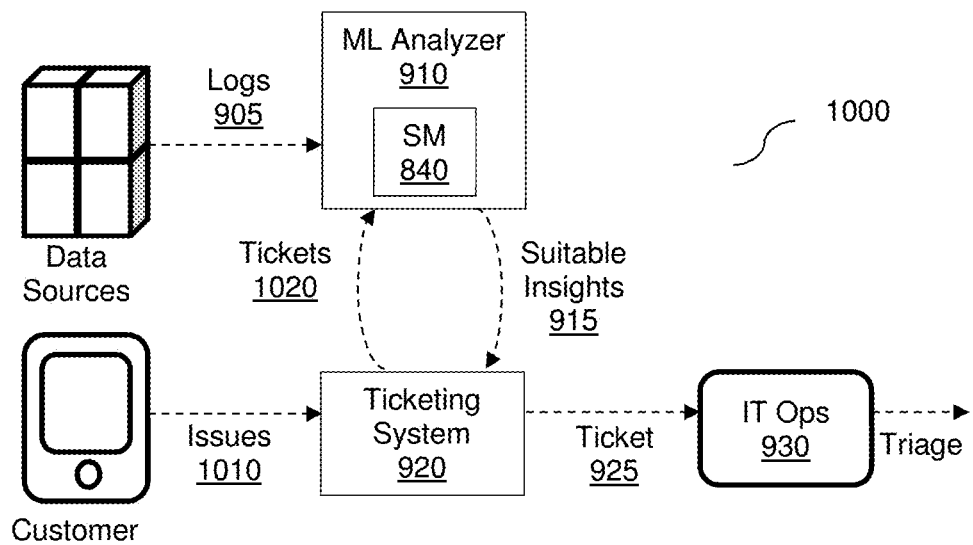
FIG. 10 is a flow diagram illustrating an example operational phase for predictive ticketing with an ongoing learning phase according to an embodiment.

FIG. 10 is a flow diagram 1000 illustrating an example operational phase for predictive ticketing with an ongoing learning phase according to an embodiment. During the operational phase, logs are received by a machine learning analyzer 910, and predictive tickets are sent to a ticketing system 920 for use by IT ops 930 as described with respect to FIG. 9.

During the operational phase, an ongoing learning phase includes receiving, at the ticketing system 920, reports of issues 1010 provided by customers. For example, the issues 1010 may be reported via emails, text messages, SMS messages, or messages received via a portal. As another example, the issues 1010 may be reported via a phone call, and an IT staff may record a textual summary of the call that describes the reported issues.

The ticketing system 920 is configured to generate tickets 1020 for the reported issues 1010, and to send the generated tickets 1020 to the machine learning analyzer 910 for refinement of the suitability model 840, thereby allowing for adapting the suitability model 840 to newly reported issues or incidents.

It should be noted that the machine learning analyzer 910 and the ticketing system 920 are shown as separate systems merely for illustrative purposes in flow diagrams 900 and 1000, and that the machine learning analyzer 910 and the ticketing system 920 may be incorporated into the same system (e.g., the ticket predictor 160). Alternatively, a predictive ticket including a textual description of an upcoming issue in the IT system may be generated and sent to the ticketing system 920, which in turn may generate and send a ticket for further evaluation.

Figure 11:
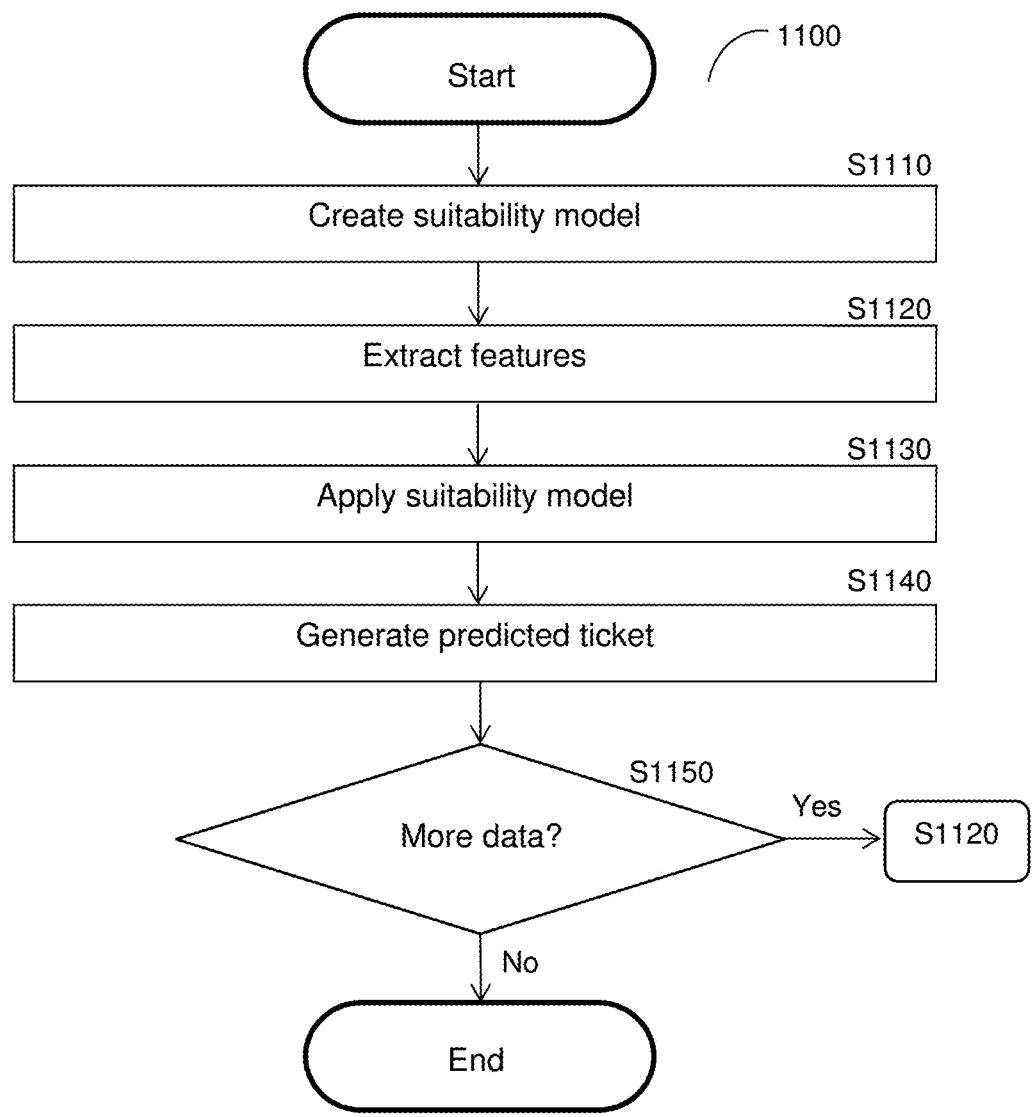
FIG. 11 is a flowchart illustrating a method for predictive ticketing according to an embodiment.

FIG. 11 is a flowchart 1100 illustrating a method for predictive ticketing according to an embodiment.

At S1110, a suitability model is created via machine learning. The suitability model is configured to output suitable insights based on incident parameters of incidents detected in an IT system and, therefore, allows for generating predictive tickets for incidents that may not have begun exhibiting symptoms yet. The suitability model is created using features extracted from historical data as described further herein above with respect to FIG. 5 and, more specifically, may be created using deep learning.

At S1120, when an incident is detected based on monitoring data related to an IT system, features are extracted from the monitoring data. The features include incident parameters for the detected incident. The features may further include root cause features extracted from a root cause detected as described, for example, hereinabove with respect to FIG. 2.

At S1130, the suitability model is applied to the extracted features. The suitability model is configured to select a suitable insight from among learned historical insights for the detected incident that may be utilized to generate a predictive ticket for future symptoms of the detected incidents. The predictive ticket may be generated prior to manifestation of the symptoms of the incident. The suitable insight is matched to a historical incident such that the suitable insight provides additional information about the historical incident described in a historical ticket.

At S1140, a predictive ticket is generated based on the suitable insight. The generated ticket includes a textual description of future symptoms of the historical incident matching the suitable insight (for example, a textual description of symptoms included in a historical ticket for that historical incident), and may further include an identifier of a root cause of the detected incident.

At S1150, it is checked if more incidents have been detected and, if so, execution continues with S1120. In an example implementation, execution may resume whenever new incidents have been detected.

It should be noted that FIGS. 8-11 are described with respect to distinct learning and operational phases merely for simplicity purposes and without limitation on the disclosed embodiments. The learning phase may continue during the operational phase such that machine learning models may be continuously refined as new data is received without departing from the scope of the disclosure. Accordingly, the suitability model may be adapted to new incidents and resulting tickets.

It should further be noted that, as described herein, the term "machine learning techniques" may be used to refer to methods that can provide computers with the ability to learn without being explicitly programmed. To this end, example machine learning techniques utilized according to the disclosed embodiments may include, but are not limited to, fuzzy logic, prioritization, scoring, and pattern detection. In particular, the present disclosure relates to supervised learning approaches in which inputs are linked to outputs via a historical data set. It should be noted that unsupervised learning approaches may be utilized without departing from the scope of the disclosure. The machine learning may be performed using historical data initially to create an initial machine learning model trained as described herein, and the machine learning model may be refined continuously based on subsequently received data.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for predictive ticketing in information technology (IT) systems, comprising:
   extracting a plurality of features from monitoring data related to an IT system, wherein the plurality of features includes at least one incident parameter representing an incident, wherein the monitoring data includes machine-generated textual data, wherein extracting the plurality of features from the monitoring data further comprises determining a root cause of the incident, wherein determining the root cause further comprises classifying the machine-generated textual data into a plurality of statistical metrics and identifying at least one incident pattern based on the plurality of statistical metrics;
   applying a machine learning model to the extracted plurality of features, wherein the machine learning model is configured to output a suitable insight for the incident, wherein the suitable insight is selected from among a plurality of historical insights; and
   generating a predictive ticket based on the suitable insight, wherein the predictive ticket includes a textual description of an expected future symptom in the IT system.

2. The method of claim 1,
   wherein the machine learning model is trained further based on a plurality of historical root causes of a plurality of historical incidents, wherein the machine learning model is further applied to the determined root cause.

3. The method of claim 2, further comprising:
   selecting at least one meaningful incident pattern from among the at least one incident pattern based on at least one of an amplitude of each of the at least one incident pattern and a frequency of each of the at least one incident pattern, wherein the root cause of the incident is determined based further on the selected at least one meaningful incident pattern.

4. The method of claim 2, wherein the at least one incident pattern includes a plurality of incident patterns, wherein the root cause is determined based further on a correlation between at least two of the plurality of incident pattern.

5. The method of claim 2, wherein the machine learning model is trained based on historical data including a plurality of historical tickets, wherein the machine learning model is created further using machine-learned ranking to identify similarities among the plurality of historical tickets, wherein the plurality of historical tickets is grouped into at least one set of historical tickets based on the identified similarities, wherein each set of historical tickets is associated with one of the plurality of historical root causes.

6. The method of claim 1, wherein a plurality of insight parameters is extracted from the plurality of historical insights, wherein the machine learning model is further configured to determine a suitability score for each of the plurality of historical insights with respect to the at least one incident parameter, wherein the suitability score for each of the plurality of historical insights is determined based on the plurality of insight parameters.

7. The method of claim 1, wherein the machine learning model is created based on historical data including a plurality of historical tickets and the plurality of historical insights, wherein the plurality of historical tickets includes textual descriptions of a plurality of historical incidents, wherein each historical insight of the plurality of historical insights is matched to at least one of the plurality of historical incidents.

8. The method of claim 7, wherein each historical insight of the plurality of historical insights further includes a recommendation for a resolution to a matched historical incident for the historical insight, wherein the predictive ticket further indicates the recommendation included in the suitable insight.

9. A non-transitory computer readable medium having stored thereon instructions for causing a processing circuitry to execute a process, the process comprising:
   extracting a plurality of features from monitoring data related to an IT system, wherein the plurality of features includes at least one incident parameter representing an incident, wherein the monitoring data includes machine-generated textual data, wherein extracting the plurality of features from the monitoring data further comprises determining a root cause of the incident, wherein determining the root cause further comprises classifying the machine-generated textual data into a plurality of statistical metrics and identifying at least one incident pattern based on the plurality of statistical metrics;
   applying a machine learning model to the extracted plurality of features, wherein the machine learning model is configured to output a suitable insight for the incident, wherein the suitable insight is selected from among a plurality of historical insights; and
   generating a predictive ticket based on the suitable insight, wherein the predictive ticket includes a textual description of an expected future symptom in the IT system.

10. A system for predictive ticketing in information technology (IT) systems, comprising:
    a processing circuitry; and
    a memory, the memory containing instructions that, when executed by the processing circuitry, configure the system to:

extract a plurality of features from monitoring data related to an IT system, wherein the plurality of features includes at least one incident parameter representing an incident, wherein the monitoring data includes machine-generated textual data, wherein extracting the plurality of features from the monitoring data further comprises determining a root cause of the incident, wherein determining the root cause further comprises classifying the machine-generated textual data into a plurality of statistical metrics and identifying at least one incident pattern based on the plurality of statistical metrics;

apply a machine learning model to the extracted plurality of features, wherein the machine learning model is configured to output a suitable insight for the incident, wherein the suitable insight is selected from among a plurality of historical insights; and generate a predictive ticket based on the suitable insight, wherein the predictive ticket includes a textual description of an expected future symptom in the IT system.

11. The system of claim 10, wherein the machine learning model is trained further based on a plurality of historical root causes of a plurality of historical incidents, wherein the machine learning model is further applied to the determined root cause.

12. The system of claim 11, wherein the system is further configured to:

select at least one meaningful incident pattern from among the at least one incident pattern based on at least one of an amplitude of each of the at least one incident pattern and a frequency of each of the at least one incident pattern, wherein the root cause of the incident is determined based further on the selected at least one meaningful incident pattern.

13. The system of claim 11, wherein the at least one incident pattern includes a plurality of incident patterns, wherein the root cause is determined based further on a correlation between at least two of the plurality of incident patterns.

14. The system of claim 11, wherein the machine learning model is trained based on historical data including a plurality of historical tickets, wherein the machine learning model is created further using machine-learned ranking to identify similarities among the plurality of historical tickets, wherein the plurality of historical tickets is grouped into at least one set of historical tickets based on the identified similarities, wherein each set of historical tickets is associated with one of the plurality of historical root causes.

15. The system of claim 10, wherein a plurality of insight parameters is extracted from the plurality of historical insights, wherein the machine learning model is further configured to determine a suitability score for each of the plurality of historical insights with respect to the at least one incident parameter, wherein the suitability score for each of the plurality of historical insights is determined based on the plurality of insight parameters.

16. The system of claim 10, wherein the machine learning model is created based on historical data including a plurality of historical tickets and the plurality of historical insights, wherein the plurality of historical tickets includes textual descriptions of a plurality of historical incidents, wherein each historical insight of the plurality of historical insights is matched to at least one of the plurality of historical incidents.

17. The system of claim 16, wherein each historical insight of the plurality of historical insights further includes a recommendation for a resolution to a matched historical incident for the historical insight, wherein the predictive ticket further indicates the recommendation included in the suitable insight.

* * * * *